United States Patent
Gnaedig

Patent Number: 5,426,888
Date of Patent: Jun. 27, 1995

[54] LANDSCAPE EDGING SYSTEM

[76] Inventor: Oscar Gnaedig, 4512 W. Madison St., Broken Arrow, Okla. 74012

[21] Appl. No.: 152,300

[22] Filed: Nov. 16, 1993

[51] Int. Cl.⁶ ............................................. A01G 1/00
[52] U.S. Cl. ................................. 47/33; 52/102; 404/6
[58] Field of Search ............ 47/33; 404/6; 52/102; 256/26

[56] References Cited

U.S. PATENT DOCUMENTS

| | | |
|---|---|---|
| D. 257,064 | 9/1980 | Kobee . |
| D. 258,313 | 2/1981 | Morris . |
| D. 276,494 | 11/1984 | Novak et al. . |
| 538,788 | 5/1895 | Moe . |
| 557,030 | 3/1896 | Schaefer ............ 47/33 |
| 1,843,108 | 2/1932 | Clayden ............ 47/33 |
| 1,977,021 | 10/1934 | Spencer ............ 47/33 |
| 2,877,600 | 3/1959 | Slate . |
| 3,256,667 | 6/1966 | Jungbluth ............ 52/630 |
| 3,495,352 | 2/1970 | Sbare ............ 47/33 |
| 3,559,338 | 2/1971 | Klingberg . |
| 3,701,477 | 10/1972 | Matt et al. . |
| 3,933,311 | 1/1976 | Lemelson . |
| 3,951,294 | 4/1976 | Wilson . |
| 4,647,491 | 3/1987 | Ireland et al. . |
| 4,747,231 | 5/1988 | LeMay ............ 47/33 |
| 5,020,272 | 6/1991 | Herrema et al. . |
| 5,065,808 | 11/1991 | Hopperdizel ............ 160/229.1 |
| 5,079,822 | 1/1992 | Downs ............ 52/314 |
| 5,299,405 | 5/1994 | Thompson ............ 52/630 |

FOREIGN PATENT DOCUMENTS

| | | | |
|---|---|---|---|
| 399250 | 10/1933 | United Kingdom ............ 47/33 |
| 679702 | 9/1952 | United Kingdom ............ 52/314 |

Primary Examiner—Henry E. Raduazo
Attorney, Agent, or Firm—Head & Johnson

[57] ABSTRACT

A landscape edging system which includes a plurality of flexible and resilient component pieces. Each component piece has a base for placement in the ground and a pair of opposed sides, each side having a protruding lip. A lip from one component piece overlaps with a lip from an adjoining piece to form an elongated continuous edging system.

13 Claims, 2 Drawing Sheets

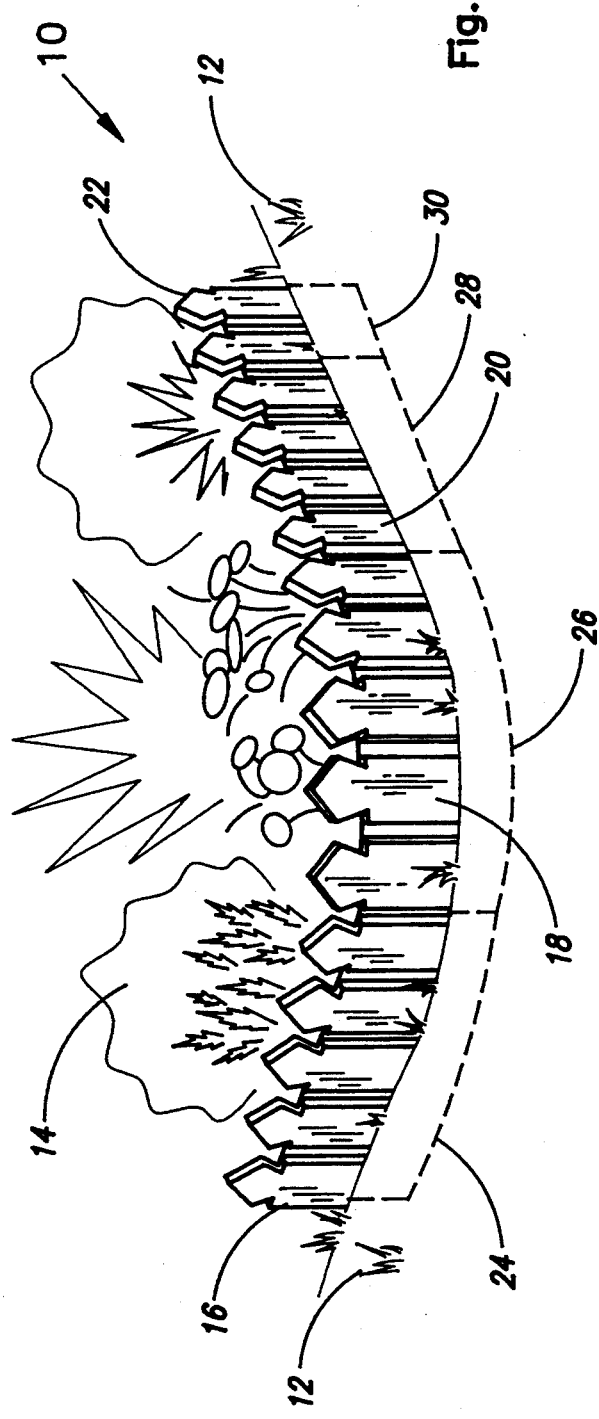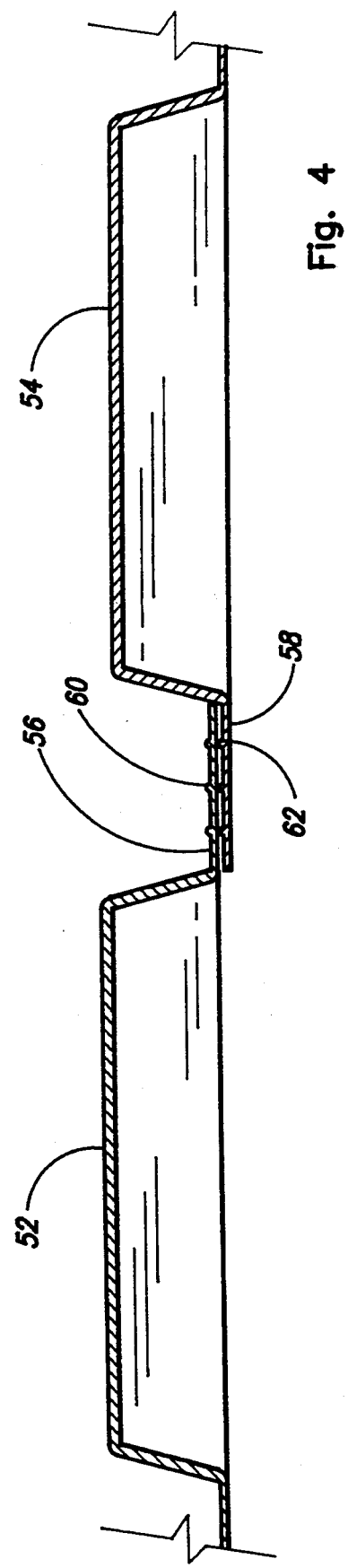

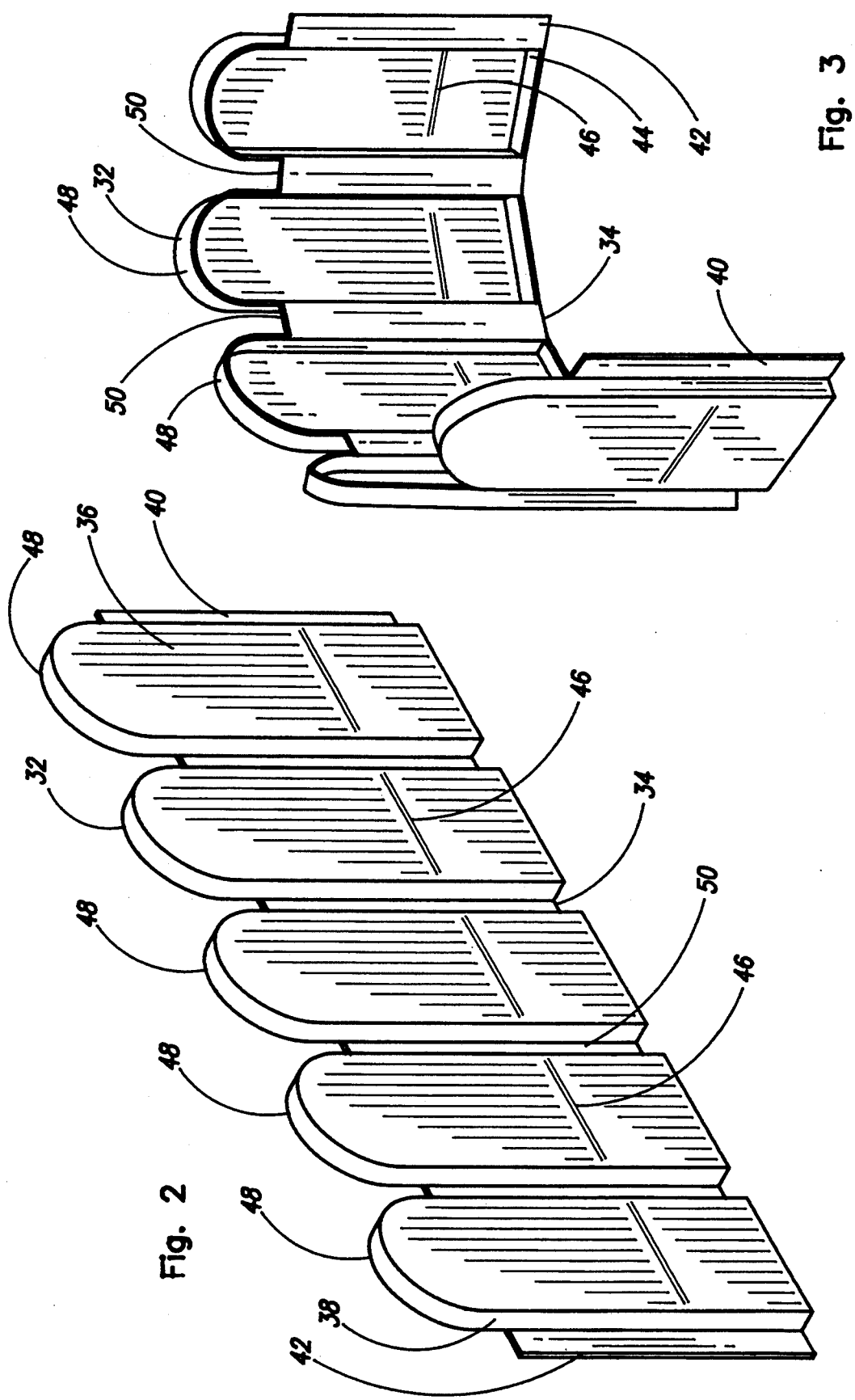

LANDSCAPE EDGING SYSTEM

BACKGROUND OF THE INVENTION

1. Field of the Invention

The present invention relates to a landscape edging system composed of multiple component pieces arranged together to define a continuous border. In particular, the present invention relates to a landscape edging system having a multiple number of resilient and flexible component pieces that may be arranged in various shapes or configurations.

2. Prior Art

Landscape edging may be used for a variety of reasons. It may be employed for a pleasing aesthetic appearance in lawns and gardens. It may be used to physically separate or mark boundaries among gardens, lawns and the like. It may be used to prevent a lawn or other growth from spreading past a desired boundary, such as preventing a lawn from spreading into a flower garden. It may also be used to hold in or retain material, such as pebbles or bark chips within a confined area.

Various types of landscape edging are known. Bricks or other material may be arranged end-to-end and buried in the ground to form an elongated, continuous border. Wooden stakes or other fencing may be utilized. While these achieve the intended purpose, they are often time consuming to install and expensive.

Continuous edging in the form of rolls of flexible rubber or other material has been utilized. While these are flexible and may be bent to any position required, they are often unattractive and have no resemblance to wooden stakes. Moreover, these continuous rolls create a fluid-tight barrier once installed. In the event of sloping terrain or run off from gutters, water can build up behind the edging.

Additionally, landscape edging assembled from component pieces has been employed. Examples of these types of landscape edging in this category are Klingberg U.S. Pat. No. 3,559,338 and Hevrema U.S. Pat. No. 5,020,272. These have the disadvantage of having the component pieces rigidly locked together. They will not accommodate expansion or shrinkage of the component pieces. Removing or replacing component pieces is made more difficult since the connectors must also be disassembled. Additionally, many of the edging systems from component pieces require stakes to secure them.

Another disadvantage of landscape edging assembled from component pieces is that the lengths are not easy to vary.

SUMMARY OF THE INVENTION

The present invention provides a landscape edging system which includes a plurality of flexible and resilient edging component pieces.

Each component piece has a base which, when installed, lies beneath the surface of the ground.

Additionally, each component piece includes a pair of opposed sides. Each side includes a protruding lip extending away from the sides. When installed to form the edging system, the lip of one component piece will overlap with a lip from an adjoining component piece to form the landscape edging system. Each of the component pieces is flexible from side-to-side.

A bottom flange extends from the base of each piece in angular relation to the component piece and also in angular relation with ground level. Once the dirt or soil is on top of the bottom flange, heaving or sinking of the edging with changes in the weather is minimized.

The component pieces may include a plurality of integral and parallel stake members connected by flexible joints. Each flexible joint is more flexible than the stake members which are relatively rigid in comparison to the flexible joints. Accordingly, the primary bending of the component piece will occur in the recess joints.

The length of each component piece may be varied by cutting one or more stakes away from the component piece. The adjacent flexible joint will thereafter become the resulting side and lip. Since the lips are similar in size and design to the flexible joints, the overlapping lips give the appearance of a continuous border.

The lips each have a plurality of extending ridges so that the adjoining lips prevent a liquid-tight seal between the adjoining component pieces.

BRIEF DESCRIPTION OF THE DRAWINGS

FIG. 1 illustrates a perspective view of a landscape edging system installed as a border between a grass lawn and a flower/shrubbery garden;

FIG. 2 illustrates a component piece of the landscape edging system of the present invention;

FIG. 3 illustrates the component piece shown in FIG. 2 which has been flexed or bent in an arc; and FIG. 4 illustrates a partial, sectional view of two component pieces as assembled in the landscape edging system of the present invention.

DETAILED DESCRIPTION OF THE PREFERRED EMBODIMENTS

Referring to the drawings in detail, FIG. 1 illustrates a perspective view of a landscape edging system 10 shown as installed in the ground in a landscape. As shown in FIG. 1, the landscape edging system 10 in the present invention provides a border or division between a grass lawn 12 and a flower/shrubbery garden 14. The present invention may also be used for other applications such as to hold in or retain material such as pebbles or bark chips. The landscape edging system 10 includes a plurality of flexible and resilient edging component pieces 16, 18, 20 and 22.

Each component piece has a base 24, 26, 28 and 30, respectively, which is buried beneath the surface of the ground (shown in FIG. 1 by dashed lines).

The component pieces are each flexible from side to side so that they may be flexed and bent to accommodate various shapes and designs. As seen in FIG. 1, each component piece is shaped to give the appearance of a plurality of parallel wooden stakes.

FIG. 2 illustrates a perspective view of one component piece 32 prior to installation in the ground and apart from the other component pieces. It will be observed that the component piece 32 in FIG. 2 has a slightly different ornamental shape than those shown in FIG. 1. It will be appreciated that the designs or shapes of the component pieces may take a variety of configurations. Each component piece 32 includes a base 34, as previously described and a pair of opposed sides 36 and 38. Each side includes a protruding lip 40 and 42, respectively, extending away from the sides.

As will be described in detail herein, the lip 40 of one component piece 32 will overlap with a lip from an adjoining component piece to form the landscape edging system.

Each of the component pieces is flexible from side-to-side so that it may be flexed or bent into an arc as shown most clearly in FIG. 3. The arcuate shape in FIG. 3 is shown for purposes of illustration. Since the piece is resilient, it would normally return to its flat form.

Once installed in a trench in the ground, the component piece 32 will be retained in the arcuate shape by force of the surrounding soil. When the component piece 32 is removed from the ground and the restraining force is removed, the component piece being resilient, will return to the substantially flat shape shown in FIG. 2.

In order to install the edging system, a narrow trench will be dug in the ground. Each of the component pieces is inserted in the trench in the ground with the lip from one piece overlapping the other. The base will then be covered with dirt.

A mechanism is provided to retain the component piece in the ground. A bottom flange 44 extends from base 34 in angular relation to the component piece 32 and also in angular relationship with ground level (not shown in FIGS. 2 or 3). In the present embodiment, the bottom flange extends vertically from the base 34. Once the dirt or soil is on top of the bottom flange, the heaving or sinking of the edging with changes in the weather is minimized.

A scribed line 46 or other marking may be provided on the component pieces in order to indicate suggested ground level.

As seen clearly in FIGS. 2 and 3, the component piece 32 includes a plurality of integral and parallel stake members 48 connected by flexible joints 50. In the present embodiment, five stake members are contained in each piece. Greater or lesser stake members may be utilized. Each of the flexible joints 50 is more flexible than the stake members 48, which are relatively rigid in comparison to the flexible joints. Accordingly, the primary bending occurs in the recess joints. As best seen in FIG. 3, bending of the component piece will produce flexing or bending at the joints.

The stake members 48 extend outward from the level of the flexible joints. This provides a three dimensional feature to the component pieces. Once the base is installed in the ground, lateral movement of the component piece is minimized.

It will also be observed that the flexible joints 50 are similar in size, shape and configuration to the extending lips 40 and 42. This provides an easy means to vary the length of each component piece 32. In order to do so, one or more stakes 48 will be cut and removed from the component piece with the flexible joint becoming the resulting side. The remaining flexible joint 50 thus forms a lip. In summary, the component pieces may be easily trimmed. It will, thus, be seen that the length of each component piece may be varied to suit the particular application.

FIG. 4 illustrates a sectional view of two component pieces 52 and 54 as they would be installed together to form a portion of the edging system 10. An extending lip 56 of component piece 52 overlaps with extending lip 58 of component piece 54. Because the component pieces 52 and 54 will overlap, but will not be rigidly connected or locked together, the edging system will accommodate expansion or shrinkage due to temperature or other factors. The lips will simply slide with respect to each other. In one embodiment, the component pieces have been found to vary approximately ⅛ inch 100° F.

The present invention provides a landscape edging system which includes a plurality of flexible and resilient edging component pieces.

Each component piece has a base which, when installed, lies beneath the surface of the ground.

Additionally, each component piece includes a pair of opposed sides. Each side includes a protruding lip extending away from the sides. When installed to form the edging system, the lip of one component piece will overlap with a lip from an adjoining component piece to form the landscape edging system. Each of the component pieces is flexible from side-to-side.

A bottom flange extends from the base of each piece in angular relation to the component piece and also in angular relation with ground level. Once the dirt or soil is on top of the bottom flange, heaving or sinking of the edging with changes in the weather is minimized.

The component pieces may include a plurality of integral and parallel stake members connected by flexible joints. Each flexible joint is more flexible than the stake members which are relatively rigid in comparison to the flexible joints. Accordingly, the primary bending of the component piece will occur in the recess joints.

The length of each component piece may be varied by cutting one or more stakes away from the component piece. The adjacent flexible joint will thereafter become the resulting side and lip. Since the lips are similar in size and design to the flexible joints, the overlapping lips give the appearance of a continuous border.

The lips each have a plurality of extending ridges so that the adjoining lips prevent a liquid-tight seal between the adjoining component pieces. F.

Since the lips are similar in size and design to the flexible joints, the overlapping lips give the appearance of a continuous border.

It will also be observed that the lips 56 and 58 each have a plurality of extending ridges 60 and 62. The ridges prevent a liquid-tight seal between the adjoining lips and between the adjoining component pieces. Accordingly, a liquid-tight seal is avoided between component pieces. This is advantageous so that water from rain or drainage does not build up on one side of the edging system. Water will be allowed to seep or otherwise work its way through the connection between the lips 56 and 58 and thereby drawn.

The edging system 10 of the present system also has the ability to be easily utilized on other than flat ground surfaces. On sloping surfaces, it may be desired to offset the component pieces since the lips 56 and 58 are not connected or rigidly connected to each other. The lips may be offset with respect to each other so that the component pieces form steps.

Whereas, the present invention has been described in relation to the drawings attached hereto, it should be understood that other and further modifications, apart from those shown or suggested herein, may be made within the spirit and scope of this invention.

What is claimed is:

1. A landscape edging system which comprises:
   a plurality of flexible and resilient edging component pieces, each piece having a base for placement in the ground and a pair of opposed sides, each side having a protruding lip;
   each said lip having a surface which can be overlapped with a lip from an adjoining said component piece; and each said component piece having a plurality of integral parallel stake members wherein adjacent stake members are connected by flexible joints wherein each said stake member is relatively rigid with respect to said flexible joint so that bending of said component pieces will produce bending at said joints and wherein each stake member is above the plane of said connecting joints.

2. A landscape edging system as set forth in claim 1 including means to retain said component pieces in said ground after insertion therein.

3. A landscape edging system as set forth in claim 2 wherein said means to retain said component pieces in said ground includes a bottom flange extending from each said base in angular relation to said component piece and in angular relationship with ground level.

4. A landscape edging system as set forth in claim 1 including means to accommodate shrinkage and expansion of said component pieces.

5. A landscape edging system as set forth in claim 1 including means to prevent a liquid tight seal between adjoining lips.

6. A landscape edging system as set forth in claim 4 wherein said means to prevent a liquid tight seal includes ridges on each said lip.

7. A landscape edging system as set forth in claim 1 including a scribed line on each said component piece to indicate suggested ground level.

8. A landscape edging system as set forth in claim 1 wherein said parallel stake members are in the shape of wooden stakes.

9. A landscape edging system as set forth in claim 1 including means to vary the length of each component piece.

10. A landscape edging system as set forth in claim 1 wherein said overlapping lips are shaped as said flexible joints.

11. A landscape edging system as set forth in claim 1 including means to offset said component pieces to form steps.

12. A landscape edging system as set forth in claim 1 wherein said component pieces are composed of weather and fade resistant plastic material.

13. A landscape edging system installed in the ground which comprises:
 a plurality of flexible and resilient edging component pieces, each piece having a pair of opposed sides;
 each said component piece having a plurality of integral parallel stake members wherein adjacent stake members are connected by flexible joints wherein each said stake member is relatively rigid with respect to said flexible joint so that bending of said component pieces will produce bending at said joints;
 a lip extending from each opposed side which is overlapped with a lip from an adjoining said component piece; and
 each piece having a base placed in the ground with lips overlapped to form a continuous edge.

* * * * *